April 12, 1927.	1,624,440
G. J. SPEICHER
COVER FOR JARS AND THE LIKE
Filed June 1, 1926
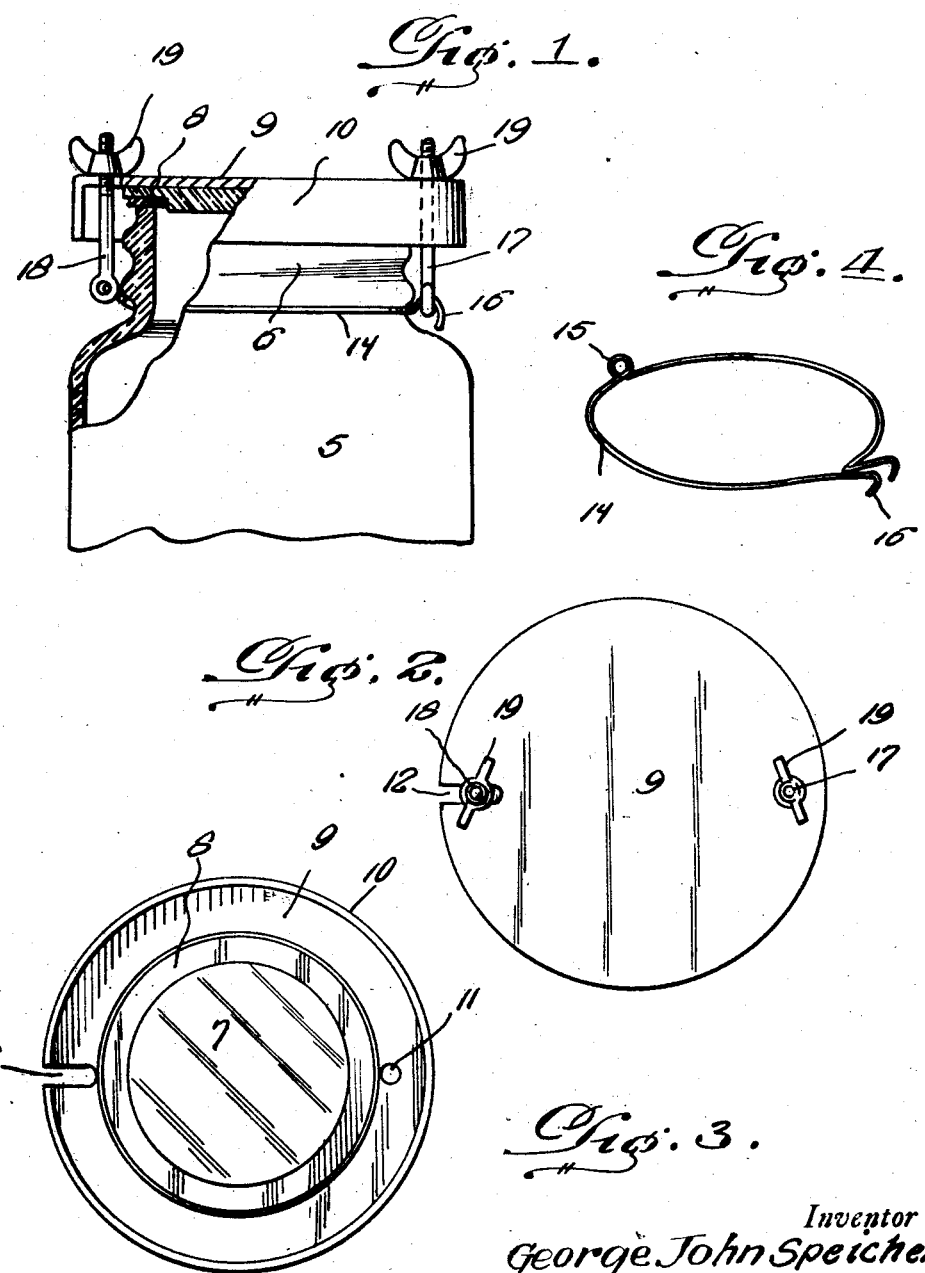
Inventor
George John Speicher,
By Clarence A. O'Brien
Attorney Patented Apr. 12, 1927.

1,624,440

UNITED STATES PATENT OFFICE.

GEORGE JOHN SPEICHER, OF MINERS MILL, PENNSYLVANIA.

COVER FOR JARS AND THE LIKE.

Application filed June 1, 1926. Serial No. 112,971.

The present invention relates to covers such as are used on Mason jars and the like, and has for its principal object to provide a structure which is sure to maintain the jar airtight, and which is capable of being easily assembled on the jar or taken therefrom.

A still further very important object of the invention lies in the provision of a cover of this nature which is exceedingly simple in its construction, reliable in use, strong, durable, easy to manipulate, inexpensive to manufacture, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 1 is a sectional elevation of the upper portion of a jar showing my improved cover associated therewith, Fig. 2 is a top plan view thereof, Fig. 3 is a bottom plan view of the cover, and Fig. 4 is a perspective view of the neck band.

Referring to the drawing in detail, it will be seen that the numeral 5 designates the well known type of Mason jar having the usual neck 6 provided with an exterior thread for the reception of the usual well known screw type of cover. The present cover intends to do away entirely with the screw threaded cover since it is very hard to place in an airtight manner on the neck and furthermore is exceedingly difficult to get off, and often is the cause of serious injury to the person attempting to manipulate the same, and often causes fruit and the like to spoil because it is not placed tightly on the jar.

The numeral 7 denotes a glass disk which has the edge portion thereof reduced for receiving a gasket 8 adapted to rest on the upper edge of the neck 6, as is illustrated clearly in Fig. 1. The numeral 9 denotes a casing which includes an annular plate body having an annular depending flange 10. The plate body 9 is provided with an opening 11 and a slot 12, the latter of which extends also through the flange 10.

A band 14 of a general annular formation has its intermediate portion looped to provide an eye 15 while the ends thereof are upwardly hooked as at 16. An eye bolt 17 has its eye portion pierced by the hooks 16 and said bolt extends up through the opening 11. The eye 15 is engaged with the eye of another eye bolt 18 so that it may be swung into the slot 12. Thumb nuts 19 are engaged on the bolts 17 and 18, in order that the casing and disk 7 may be tightened down on the gasket 8 to provide air-tight closure.

To remove the cover from the jar, the thumb nuts or the like are loosened from the bolts 17 and 18. The bolt 18 is then swung out of the slot 12. The cover may then be easily removed by unhooking the bolt 17 from the hooks 16. To place the cover on the jar, the band 14 is first placed above the neck of the jar so as to slip under the shoulder formed by the lower thread of the neck. The bolt 18, of course, is already engaged on the eye 15. The eye of the bolt 17 is then engaged with the hook end, 16, thus holding the band about the neck.

The rubber gasket 8 is placed on the upper edge of the neck, the disk 7 is placed on the gasket, and the casing 9 is placed on the disk with the bolt 17 extending through the opening 11. The bolt 18 may then be swung up into the slot 12 and the wing nuts 19 placed on the bolts and tightened to secure the cover in place in an airtight manner.

From the above detailed description, it will be seen that I have produced an exceedingly simple construction which may be manufactured at a low cost, and is capable of being manipulated with ease both for the purpose of assembly and disassembly.

It is thought that the construction, operation, utility, and advantages of the invention will now be clearly understood by those skilled in this art without a more detailed description thereof. The present embodiment of the invention has been disclosed in detail, merely by way of example, since in actual practice it attains the features of advantage enumerated as desirable in the statment of the invention and the above description. It will be apparent that numerous changes in the details of construction, and in the combination and arrangement of parts may be resorted to without departing from the spirit or scope of the invention as hereinafter claimed, or sacrificing any of its advantages.

Having thus described my invention, what I claim as new is:—

1. A device of the class described including a band of a general annular formation having its intermediate portion provided with an eye and at its ends provided with hooks, an eye bolt engaged with the eye of the band, and a second eye bolt engaged with the hooks, a disk, a casing over the disk having an opening for receiving one bolt, and a slot for receiving the other bolt, and nuts for the bolts.

2. A device of the class described including an annular band having its intermediate portion formed with an eye and its ends terminating in hooks, an eye bolt engaged with the eye, a second eye bolt engaged with the hooks, and a casing provided with an opening for receiving one bolt and a slot for receiving the other bolt, and nuts associated with said bolts.

In testimony whereof I affix my signature.

GEORGE JOHN SPEICHER.